(12) United States Patent
Grech (10) Patent No.: US 9,764,779 B2
(45) Date of Patent: *Sep. 19, 2017

(54) BUS WITH A PANORAMIC FRONT WINDOW

(71) Applicant: Edward P Grech, Riverside, CA (US)

(72) Inventor: Edward P Grech, Riverside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/568,055

(22) Filed: Dec. 11, 2014

(65) Prior Publication Data

US 2016/0167485 A1   Jun. 16, 2016

Related U.S. Application Data

(63) Continuation of application No. 14/168,791, filed on Jan. 30, 2014, now Pat. No. 8,910,992.

(51) Int. Cl.
| | |
|---|---|
| *B62D 31/00* | (2006.01) |
| *B62D 31/02* | (2006.01) |
| *B60J 1/02* | (2006.01) |
| *B62D 47/02* | (2006.01) |

(52) U.S. Cl.
CPC .............. *B62D 31/02* (2013.01); *B60J 1/02* (2013.01); *B62D 47/02* (2013.01)

(58) Field of Classification Search
CPC ....................................................... B60J 1/02
USPC .............. 296/84.1, 178, 164, 166, 90, 96.12
See application file for complete search history.

(56) References Cited

U.S. PATENT DOCUMENTS

| | | |
|---|---|---|
| D237,699 S | 11/1975 | Brennan et al. |
| D314,733 S | 2/1991 | Richter, Jr. et al. |
| 5,188,419 A * | 2/1993 | Liethen ................... B60R 11/00 296/190.1 |
| D376,772 S | 12/1996 | Martin |
| D384,914 S | 10/1997 | Bingaman |
| D391,524 S | 3/1998 | Anderson et al. |
| D409,951 S | 5/1999 | Grech |
| D411,141 S | 6/1999 | Gerisch et al. |
| 5,934,738 A | 8/1999 | Welles |
| D436,894 S | 1/2001 | Barraclough et al. |
| D466,442 S * | 12/2002 | Cornell .......................... D12/84 |
| D531,546 S | 11/2006 | Fillion et al. |
| 7,891,725 B2 * | 2/2011 | Blair ...................... B62D 31/02 296/178 |
| D656,866 S | 4/2012 | Wise |
| D708,557 S | 7/2014 | Grech |
| D711,786 S | 8/2014 | Brzustowicz et al. |
| 8,910,992 B2 * | 12/2014 | Grech ........................ B60J 1/02 296/178 |
| D727,811 S | 4/2015 | Grech |

OTHER PUBLICATIONS

U.S. Appl. No. 29/480,926, dated Apr. 24, 2015, Grech office action.
(Continued)

*Primary Examiner* — Joseph D Pape
(74) *Attorney, Agent, or Firm* — John J. Connors; Connors & Assoc.

(57) ABSTRACT

My bus enhances the viewing experience of passengers by providing a panoramic front window to enable a passenger to see into a cab section of the bus and through the panoramic front window. The panoramic front window has a predetermined configuration that minimizes drag.

6 Claims, 9 Drawing Sheets

(56) References Cited

OTHER PUBLICATIONS

U.S. Appl. No. 29/480,926, dated Oct. 8, 2015, Grech office action.
U.S. Appl. No. 29/480,931, dated Apr. 24, 2015, Grech office action.
U.S. Appl. No. 29/480,931, dated Jan. 22, 2016, Grech office action.
U.S. Appl. No. 29/480,931, dated Jul. 28, 2016, Grech office action.
U.S. Appl. No. 29/480,934, dated Dec. 8, 2014, Grech office action.
U.S. Appl. No. 29/480,934, dated Apr. 24, 2015, Grech office action.
U.S. Appl. No. 29/480,934, dated Jan. 22, 2016, Grech office action.
U.S. Appl. No. 29/480,934, dated Jul. 29, 2016, Grech office action.
Letter of Dec. 2, 2015, Ameritrans Bus and ABC Bus, citing patents and non-patent literature, U-Tube video, websites, etc., also being disclosed separately on this form.
Exhibt A Jan. 28, 2013 YouTube video, Exhibit B Concorde II by Glaval Bus Brochure.
Exhibt C Ameritrans Bus Close Ups.
http://denver.craigslist.org/c1d/527084242484.html 2008 Ford F650 Glaval Midsize Tour Bus.
http://www.bestbussales.com/inventory/vehicles.php 2009 Glaval Concorde II.
http://donbrownbus.com/inventory/196512 2012 Newport Coachworks Luxury Shuttle Bus.
http://www.turtletop.com/.
www.federalcoachbus.com.
www.freightlinertrucks.com.
Krystal F650 Bus Brochure Krystalbus.net.

\* cited by examiner

BUS WITH A PANORAMIC FRONT WINDOW

INCORPORATION BY REFERENCE

This utility application is a continuation application of U.S. application Ser. No. 14/168,791, filed Jan. 30, 2014, now U.S. Pat. No. 8,910,992. This related application is incorporated herein by reference and made a part of this application. Moreover, any and all U.S. patents, U.S. patent applications, and other documents, hard copy or electronic, cited or referred to in this application are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

BACKGROUND

Passenger buses typically include a forward cab section were the driver sits and a rear section connected to the forward cab section. Passengers sit in the rear section. A partition wall may be between these sections that completely or partially blocks a view by passengers through a front window in the cab section. Alternatively, the rear cab section may be a higher elevation then the forward cab section completely or partially blocking a view by passengers. The front window of the forward cab section typically has a trapezoidal shape and is slanted rearward to minimize drag.

SUMMARY

My bus enhances the viewing experience of passengers by providing a panoramic front window to enable a passenger to see into the forward cab section and through the panoramic front window. The panoramic front window has a predetermined configuration that minimizes drag. My bus has one or more of the features depicted in the embodiments discussed in the section entitled "DETAILED DESCRIPTION OF SOME ILLUSTRATIVE EMBODIMENTS." The claims that follow define my bus with a panoramic window, distinguishing it from the prior art; however, without limiting the scope of my bus as expressed by these claims, in general terms, some, but not necessarily all, of its features are:

One, my bus includes a forward cab section and a rear passenger section connected to the forward cab section. A partition wall is between the sections and has an enlarged central opening therein. The enlarged opening has a predetermined height and width with the height being greater than said width. The forward cab section has a driver compartment comprising opposed sides connected by a roof and a OEM front cab window having an upper horizontally oriented edge having a predetermined width. In the cab section is front cab window that may be trapezoidal in shape and be slanted rearward at an angle of from 20 to 60 degrees.

Two, the driver compartment comprises opposed sides connected by a roof and a front cab window that is rearward slanting. In one embodiment, the front cab window is trapezoidal in shape and has a single curved exterior surface with a radius of curvature along a longitudinal central axis of the front wall from 100 to 150 inches. The partition wall's enlarged opening has a top portion and a bottom portion, and the top portion is positioned with respect to the window cab unit and the bottom portion is positioned with respect to the driver compartment to enable a passenger to simultaneously look through both the window cab unit and driver compartment and see through both the front cab window and the forward-facing panoramic window.

Three, the rear passenger section has a passenger compartment and a window cap unit forward of the passenger compartment that overlies the roof of the driver compartment and has therein a forward-facing panoramic window that is rearward slanting. In one embodiment, the window cap unit's forward-facing window is trapezoidal in shape and slanted rearward at an angle of from 40 to 50 degrees.

Four, the forward-facing panoramic window may have a predetermined height of at least 19 inches and a first horizontally oriented edge that has a width dimension that is greater than a second opposed horizontally oriented edge that has a width dimension equal to or at least 90 percent of said predetermined width of said upper horizontally oriented edge of the front cab window. The forward-facing window may be positioned so that its second edge is adjacent the upper edge of the front cab window and is aligned centrally along a common central reference line with the front cab window to form a panoramic front window. The front cab window's upper horizontally oriented edge is contiguous with or spaced from the second edge of the forward-facing window's by a distance no greater than 6 inches.

Five, the forward-facing panoramic window of the window cap may have a convex exterior surface comprising a compound curvature with a radius of curvature along a longitudinal central axis of the front wall is from 150 to 190 inches and along a latitudinal central axis of the front window is from 150 to 190 inches. The front cab window may have a single curved exterior surface with a radius of curvature along a latitudinal central axis of the front wall is from 100 to 150 inches.

Six, exterior surfaces of the front cab window and forward-facing panoramic window of the window cap may make an obtuse angle ranging from 150 to 210 degrees.

Seven, the cab section window and the window cap unit window are positioned with a shortest width dimension of each of these windows adjacent each other and the windows aligned centrally along a common central reference line and forming a panoramic front window.

Eight, the passenger compartment may include seats for passengers positioned with respect to the panoramic window to enable a passenger when seated in a seat to see simultaneously through the enlarged opening into the cab section and into the window cap unit and through the panoramic front window.

Nine, the passenger compartment may have a floor supporting the seats and a doorway on a side of the passenger section with at least one step to assist passengers to enter the passenger section. The floor is positioned with respect to the panoramic window, and the predetermined height of the forward-facing window and the enlarged opening in the partition wall are all sufficiently large to enable a passenger when seated in a seat or standing on the floor and looking towards the driver compartment to see into the cab section and into the window cap unit and through the panoramic front window.

Ten, the cab section window has a perimeter including an upper horizontally oriented edge, and the window in window cap unit is located above the cab section window and has a perimeter including a lower horizontally oriented edge.

The cab section window and the window cap unit window are positioned so their horizontally oriented edges are adjacent each other and the windows are aligned along a common central reference line to form the panoramic front window. The horizontally oriented edges are contiguous with or spaced from each other by a distance no greater than 6 inches, and the combined perimeters of said windows forming in outline of an hourglass shape.

These features are not listed in any rank order nor is this list intended to be exhaustive.

DESCRIPTION OF THE DRAWING

Some embodiments of my bus are discussed in detail in connection with the accompanying drawing, which is for illustrative purposes only. This drawing includes the following figures (Figs.), with like numerals and letters indicating like parts.

DETAILED DESCRIPTION OF SOME ILLUSTRATIVE EMBODIMENTS

Figure 6:
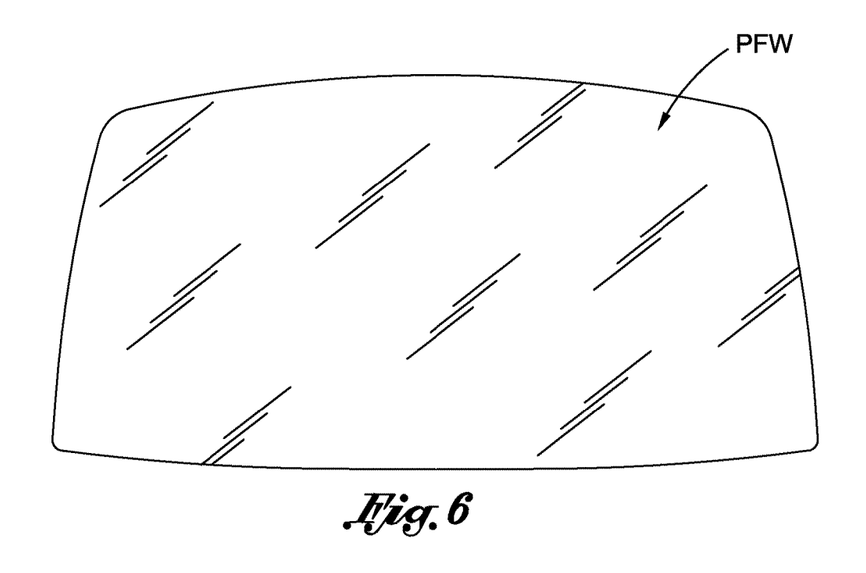
FIG. 6 is a plan view looking at the exterior of a first embodiment of the forward-facing window of the passenger section's window cap unit of the embodiment of my bus illustrated in FIG. 1.
Figure 7:
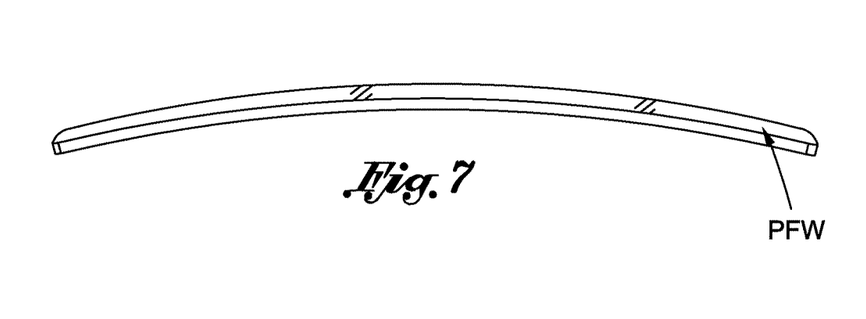
FIG. 7 is a perspective view of the embodiment of the forward-facing window illustrated in FIG. 6 looking along a latitudinal axis at the window's interior.
Figure 8:
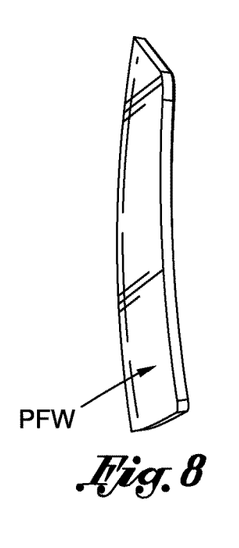
FIG. 8 is a perspective view of the embodiment of the forward-facing window illustrated in FIG. 6 looking along a longitudinal axis at the window's interior.
Figure 9:
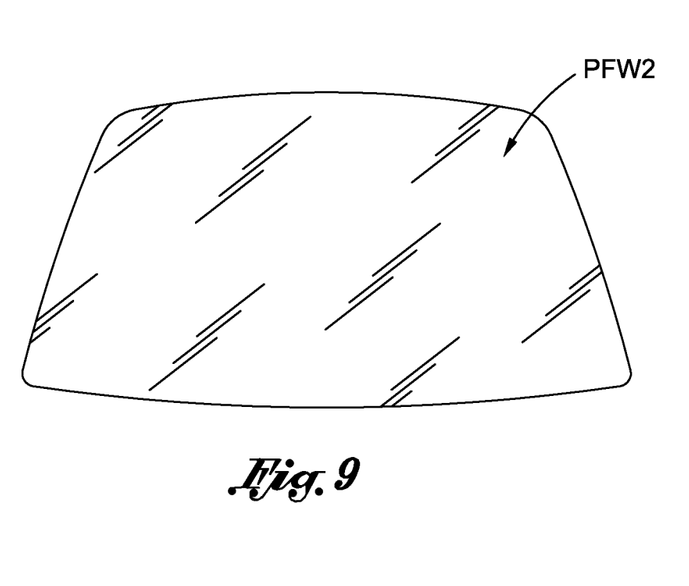
FIG. 9 is a plan view looking at the exterior of a second embodiment of a forward-facing window of the passenger section's window cap unit.
Figure 10:
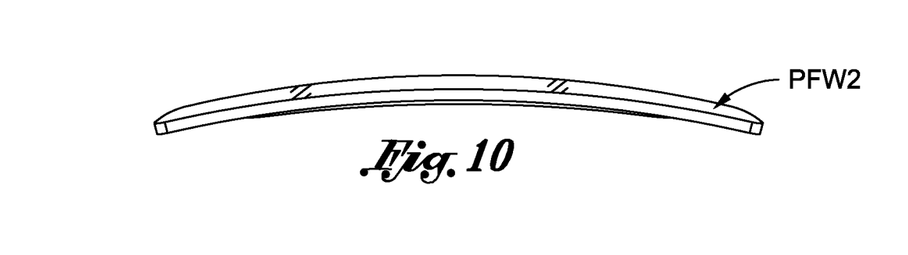
FIG. 10 is a perspective view of the embodiment of the forward-facing window illustrated in FIG. 9 looking along a latitudinal axis at the window's interior.
Figure 11:
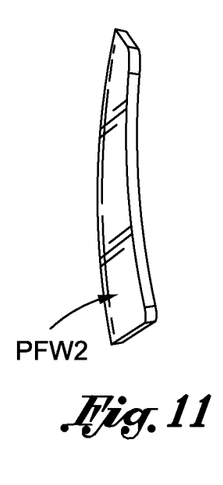
FIG. 11 is a perspective view of the embodiment of the forward-facing window illustrated in FIG. 9 looking along a longitudinal axis at the window's interior.
Figure 12:
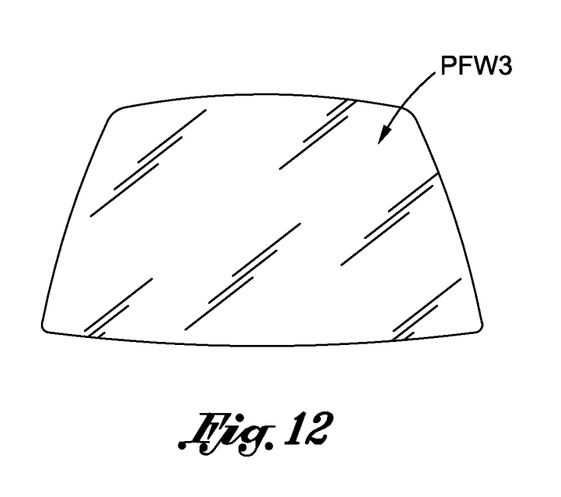
FIG. 12 is a plan view looking at the exterior of a third embodiment of the forward-facing window of the passenger section's window cap unit.
Figure 13:
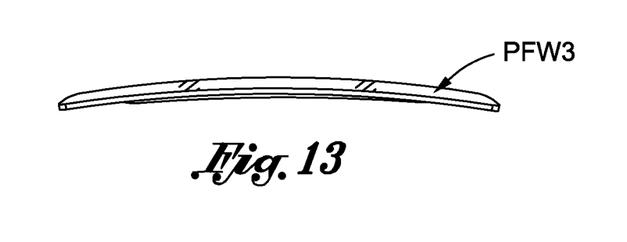
FIG. 13 is a perspective view of the forward-facing window illustrated in FIG. 12 looking along a latitudinal axis at the window's interior.
Figure 14:
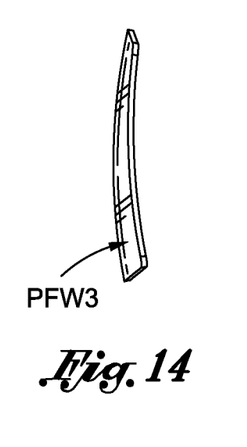
FIG. 14 is a perspective view of the embodiment of the forward-facing window illustrated in FIG. 12 looking along a longitudinal axis at the window's interior.

My bus has several embodiments employing panoramic front windows of different sizes. For example, FIGS. 6 through 8 depict a first embodiment panoramic front window designated by the letters PFW, FIGS. 9 through 11 depict a second embodiment designated by the alpha-numeral PFW2, and FIGS. 12 through 14 depict a third embodiment designated by the alpha-numeral PFW3.

Figure 5:
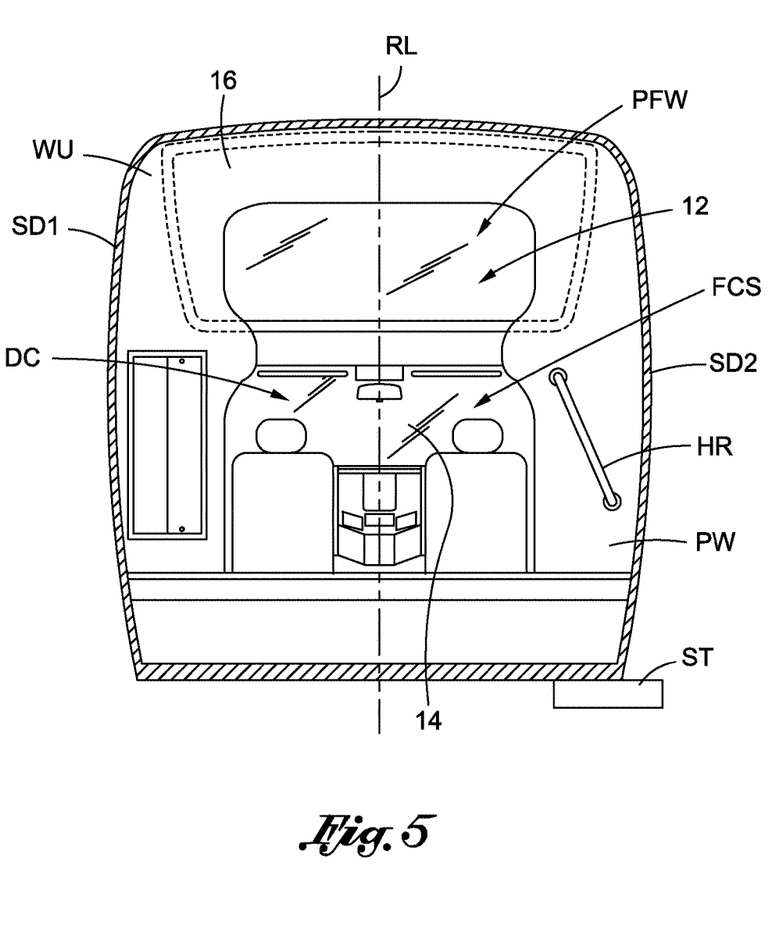
FIG. 5 is a passenger's view from inside the passenger section of the embodiment of my bus illustrated in FIG. 1 where the window cap unit employs the forward-facing window depicted in FIGS. 6 through 8.

FIGS. 1 through 8 illustrate one embodiment of my bus generally designated by the numeral 10 and employing the panoramic front window PFW. The bus 10 includes a forward cab section FCS and a rear passenger section RPS connected to the forward cab section with a partition wall PW between these sections. As best depicted in FIG. 5, the partition wall PW (FIG. 5) has an enlarged opening 12 therein that enables passengers seated or standing in the rear passenger section RPS to look through the panoramic front window PFW when looking towards the forward cab section FCS.

Figures 1, 1A:
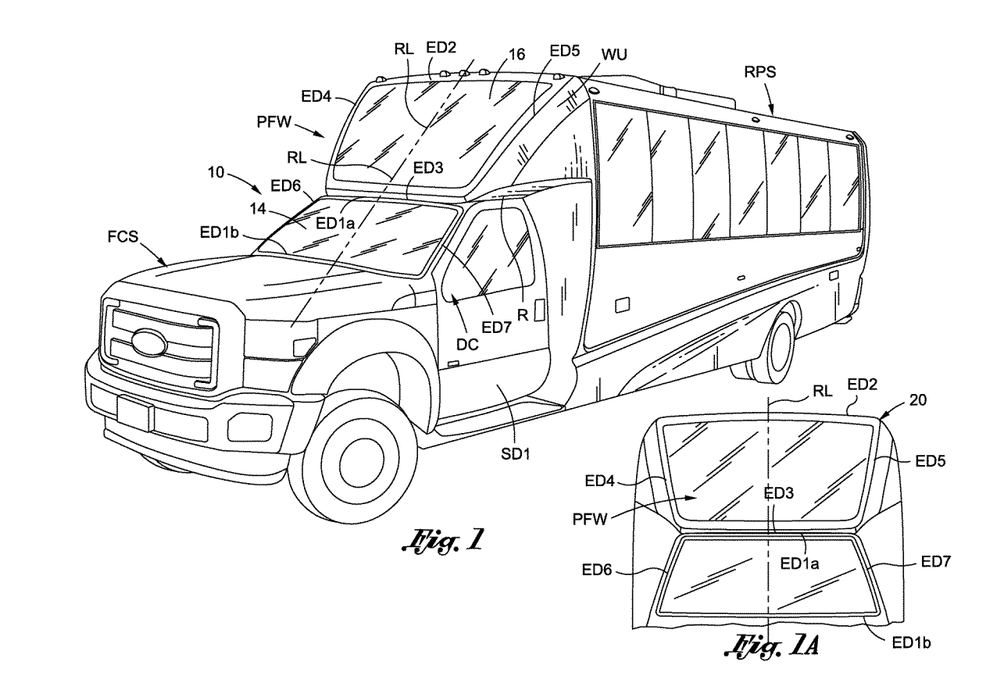
FIG. 1 is a perspective view of one embodiment of my bus with a panoramic front window.
FIG. 1A is fragmentary front view of the one embodiment of my bus depicted in FIG. 1 illustrating one embodiment of a panoramic front window.
Figure 2:
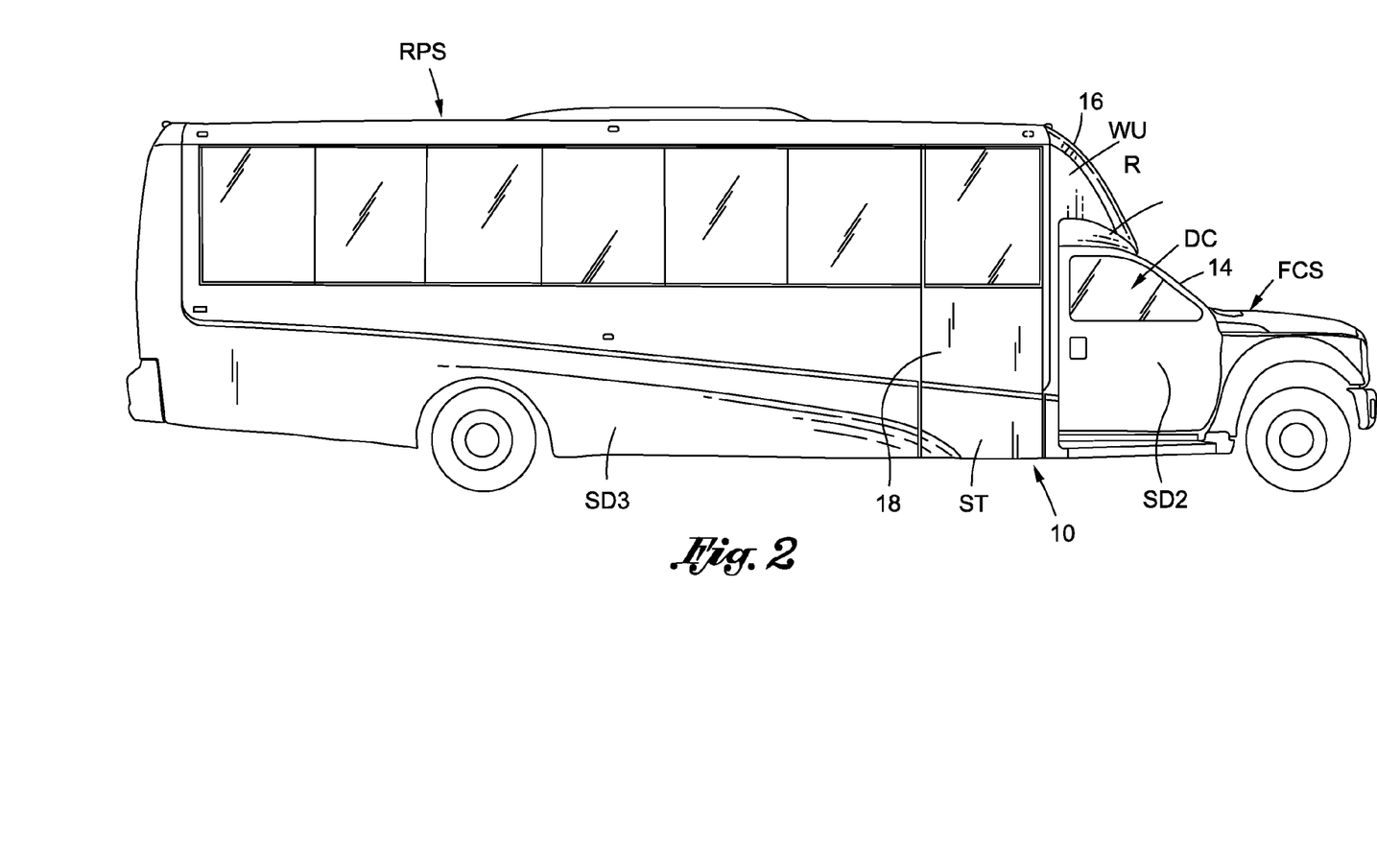
FIG. 2 is a right side elevation view of the embodiment of my bus illustrated in FIG. 1.

As best illustrated in FIG. 1, the forward cab section FCS has a driver compartment DC comprising opposed sides SD1 and SD2 connected by a roof R and a front cab window 14 having an upper horizontally oriented edge longitudinal ED1$a$ and a lower horizontally oriented edge longitudinal ED1$b$. The lower edge ED1$b$ has a width that mostly extends across the entire width of the forward cab section FCS. The typical width of an automotive vehicle cab section is from 70 to 90 inches. The upper edge ED1$a$ has a width that is from 15 to 30 percent less than that of the edge ED1$b$. The front cab window 14 is trapezoidal in shape, is slanted rearward at an angle A (FIG. 3) of from 20 to 60 degrees with respect to a horizontal reference line HRL1, and has a height of at least 18 inches. The typical height of an automotive vehicle's front window is from 18 to 28 inches.

The rear passenger section RPS has a passenger compartment PC (FIG. 4) and a window cap unit WU forward of the passenger compartment that overlies the roof R of the driver compartment DC. The passenger compartment PC has a floor F supporting two rows of passenger seats PS for the passengers and a doorway DW on a side SD3 (FIG. 2) of the rear passenger section RPS next to the partition wall PW opposite a driver of the bus. A door 18 mounted in the doorway DW opens onto at least one step ST in the floor F that assists passengers to enter the passenger compartment PC.

Figure 3:
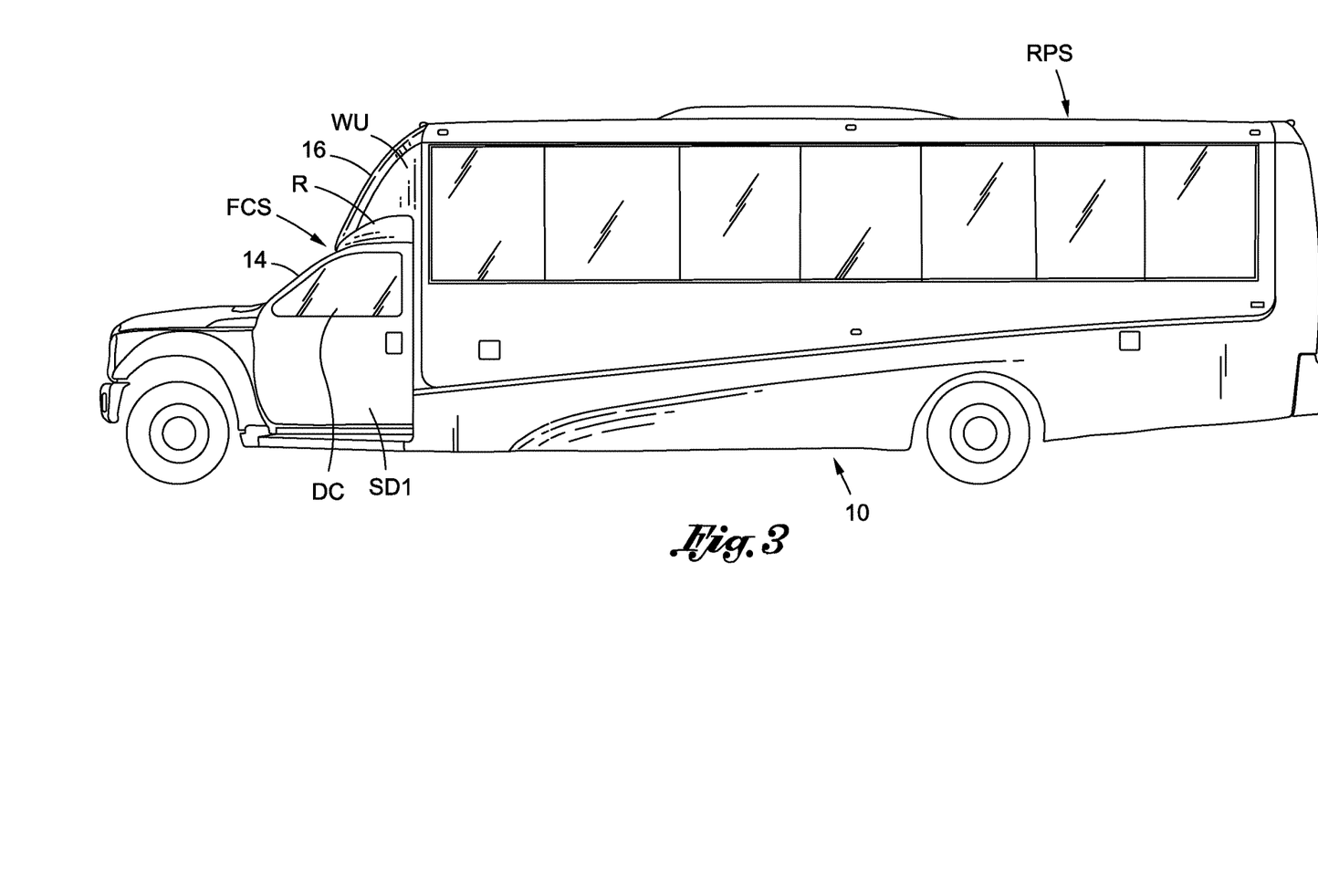
FIG. 3 is a left side elevation view of the embodiment of my bus illustrated in FIG. 1.
Figure 4:
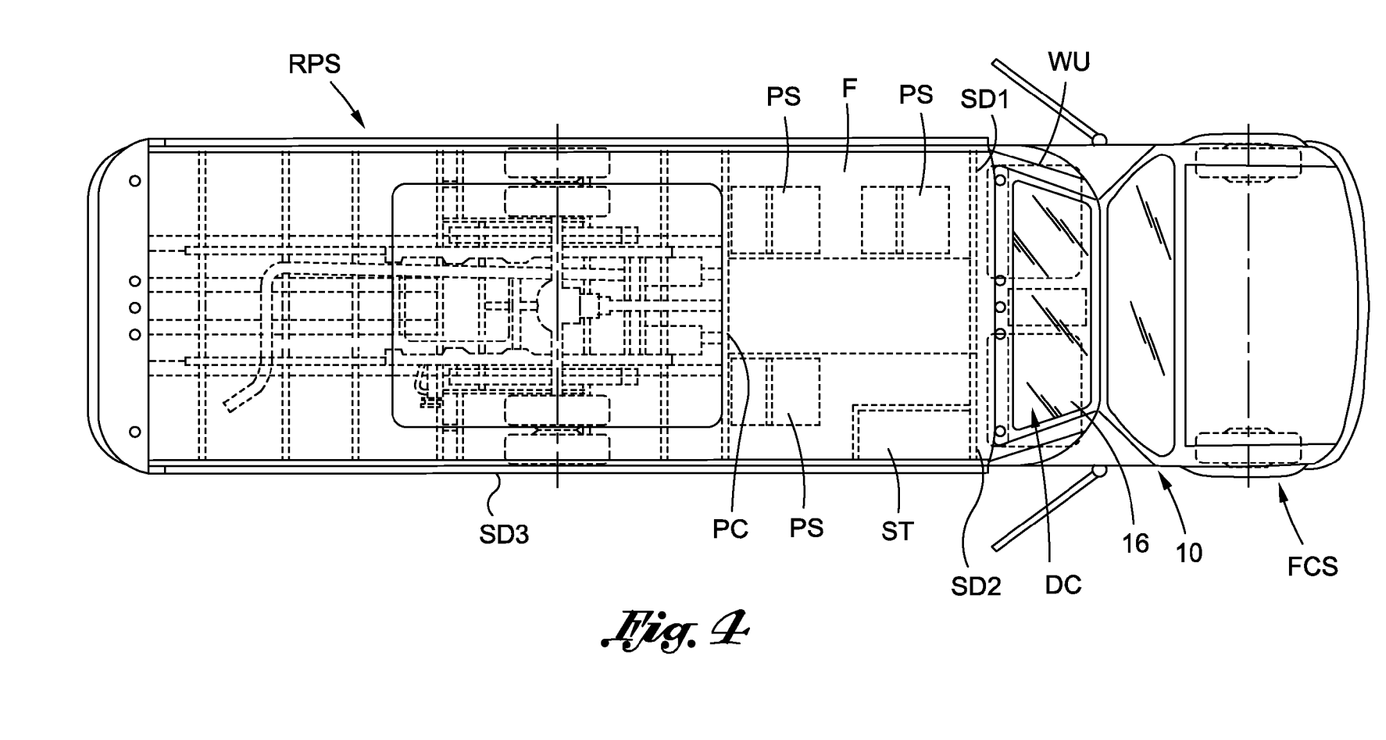
FIG. 4 is a top plan view of the embodiment of my bus illustrated in FIG. 1 with some internal components shown in dotted lines.

The window cap unit WU includes a rearward slanted, forward-facing window 16 that is trapezoidal in shape, is slanted rearward at an angle B (FIG. 3) of from 40 to 60 degrees with respect to a horizontal reference line HRL2, and has a predetermined height of at least 18 inches, typically ranging from 18 to 24 inches. The exterior surfaces of the front cab window 14 and the forward-facing window 16 make an obtuse angle C (FIG. 3).

As best illustrated in FIG. 1, an upper horizontally oriented first longitudinal edge ED2 has a width dimension that is greater than a lower horizontally oriented second longitudinal edge ED3. This lower edge ED3 has a width dimension equal to or at least 90 percent of predetermined width of the upper edge ED1$a$ of the front cab window 14.

The panoramic front window PFW comprises both the front cab window 14 and the forward-facing window 16 as best shown in FIGS. 1 and 5. The front cab window 14 and forward-facing window 16 are positioned so that the forward-facing window's lower edge ED3 is adjacent the upper edge ED1a of the front cab window and they are aligned centrally along a common central reference line RL with each other to form the panoramic front window PFW. As best shown in FIG. 1A, the side edges ED4 and ED5 of the upper window 16 and the side edges ED6 and ED7 slant, respectively, inward towards the horizontally oriented edges ED3 and ED1a form an hourglass configured perimeter 20 of the panoramic front window PFW The positioned floor F is with respect to the panoramic front window PFW, the size of the forward-facing window, particularly its height, and the size of enlarged opening 12 in the partition wall PW are configured to enable a passenger when seated in a passenger seat PS or standing on the floor F to see into the a driver compartment DC and through the panoramic front window PFW.

Figure 15:
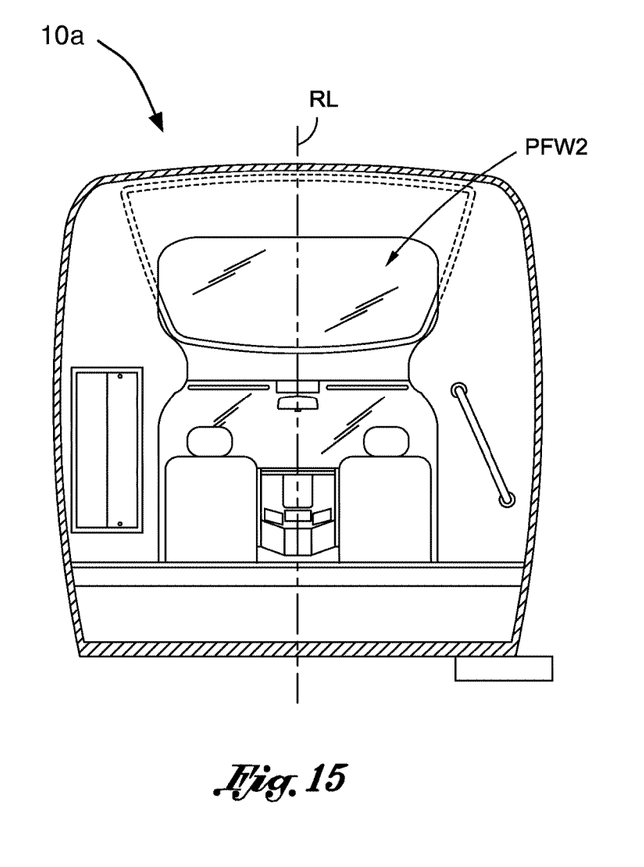
FIG. 15 is a passenger's view from inside the passenger section of a second embodiment of my bus where the window cap unit employs the forward-facing window depicted in FIGS. 9 through 11.
Figure 16:
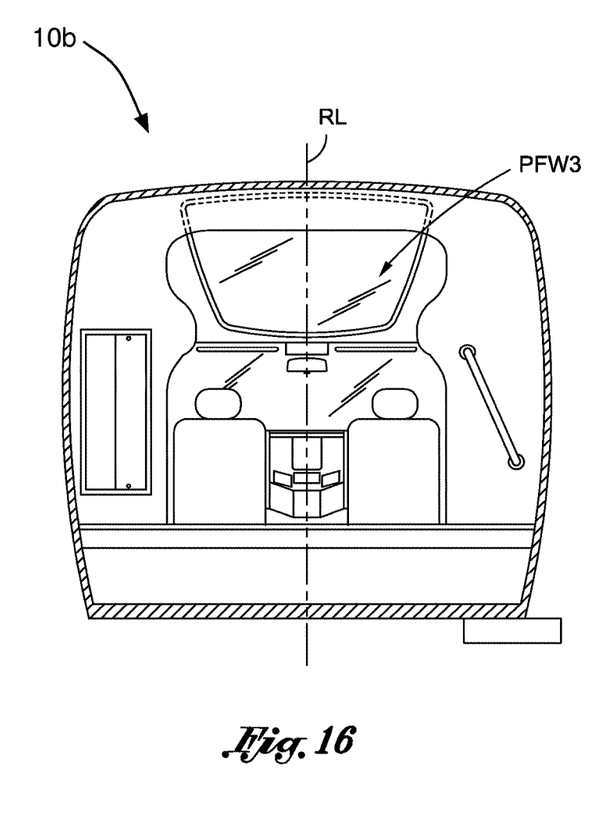
FIG. 16 is a passenger's view from inside the passenger section of a second embodiment of my bus where the window cap unit employs the forward-facing window depicted in FIGS. 12 through 14.

The embodiment of my bus designated by the numeral 10a (FIG. 15) employs the panoramic front window PFW2. Since the height of this panoramic front window PFW2 isn't as great as the height of the panoramic front window PFW, the area through which a passenger sees the outside is reduced. The embodiment of my bus designated by the numeral 10b (FIG. 16) employs the panoramic front window PFW3. Again, since the height of this panoramic front window PFW3 isn't as great as the heights of the panoramic front windows PFW and PFW2, the area through which a passenger sees the outside is further reduced. Nevertheless, these reduced areas of passenger view in the second and third embodiments still provided an enhanced passenger viewing experience.

SCOPE OF THE INVENTION

The above presents a description of the best mode I contemplate of carrying out my bus, and of the manner and process of making and using it in such full, clear, concise, and exact terms as to enable a person skilled in the art to make and use. My bus is, however, susceptible to modifications and alternate constructions from the illustrative embodiments discussed above which are fully equivalent. Consequently, it is not the intention to limit my bus to the particular embodiments disclosed. On the contrary, my intention is to cover all modifications and alternate constructions coming within the spirit and scope of my bus as generally expressed by the following claims, which particularly point out and distinctly claim the subject matter of my invention:

The invention claimed is:

1. A bus for transporting passengers including
a forward cab section including a front cab window and a rear passenger section including a window cap unit that overlies the forward cab section and includes a forward facing window,
said sections connected to enable a passenger in the rear passenger section to see into the cab section and into window cap unit,
said front cab window and said window cap unit window aligned along a common central reference line to form a panoramic front window, and
said front cab window and said window cap unit window have edges that are configured to form combined perimeters of said windows that form an outline of an hourglass shape.

2. The bus of claim 1 where the perimeter of each window is trapezoidal in shape, and slants rearward at an angle of from 20 to 60 degrees, and said windows each have an exterior surface which make an obtuse angle with each other ranging from 150 to 210 degrees.

3. A bus for transporting passengers including
a forward cab section and a rear passenger section separated by a partition wall having an enlarged central opening therein,
said forward cab section having a driver compartment including a front cab window having a trapezoidal shape,
said rear passenger section having a passenger compartment and a window cap unit forward of the passenger compartment that overlies the driver compartment,
said window cap unit including an enlarged, forward-facing window aligned centrally along a common central reference line with the front cab window, said forward-facing window having a trapezoidal shape,
said front cab window and said window cap unit window having edges defining perimeters that in combination have in outline an hourglass shape, and said front cab window and said window cap unit window combined form a panoramic front window,
said forward cab section and rear passenger section connected together to enable a passenger in the rear passenger section to look through the panoramic front window, and
said passenger compartment including seats for passengers positioned with respect to the panoramic window to enable a passenger when seated in a seat to see through the enlarged opening into the cab section and into the window cap unit and through the panoramic front window.

4. The bus of claim 3 where the perimeter of each window is trapezoidal in shape, and slants rearward at an angle of from 20 to 60 degrees, and said windows each have an exterior surface which make an obtuse angle with each other ranging from 150 to 210 degrees.

5. A bus for transporting passengers including
a forward cab section and a rear passenger section,
said forward cab section having a driver compartment including a front cab window,
said rear passenger section having a passenger compartment and a window cap unit forward of the passenger compartment that overlies the driver compartment,
said window cap unit including an enlarged, forward-facing window aligned centrally along a common central reference line with the front cab window,
said passenger compartment having a floor supporting seats for the passengers and a doorway on a side of the passenger section,
said front cab window and said window cap unit window having edges defining perimeters that in combination have in outline an hourglass shape, and said front cab window and said window cap unit window combined form a panoramic front window,
said forward cab section and rear passenger section connected to position said floor with respect to the front cab window and the forward-facing window to enable a passenger when seated in a seat or standing on the floor and looking towards the driver compartment to see into the cab section and into the window cap unit and through both the front cab window and the forward-facing window.

6. The bus of claim 5 where the perimeter of each window is trapezoidal in shape, slants rearward at an angle of from 20 to 60 degrees, and said windows each have an exterior surface which make an obtuse angle with each other ranging from 150 to 210 degrees.

\* \* \* \* \*